July 16, 1929.  E. E. HAMPTON ET AL  1,721,114
VALVE FOR SLUSH PUMPS
Filed June 29, 1927
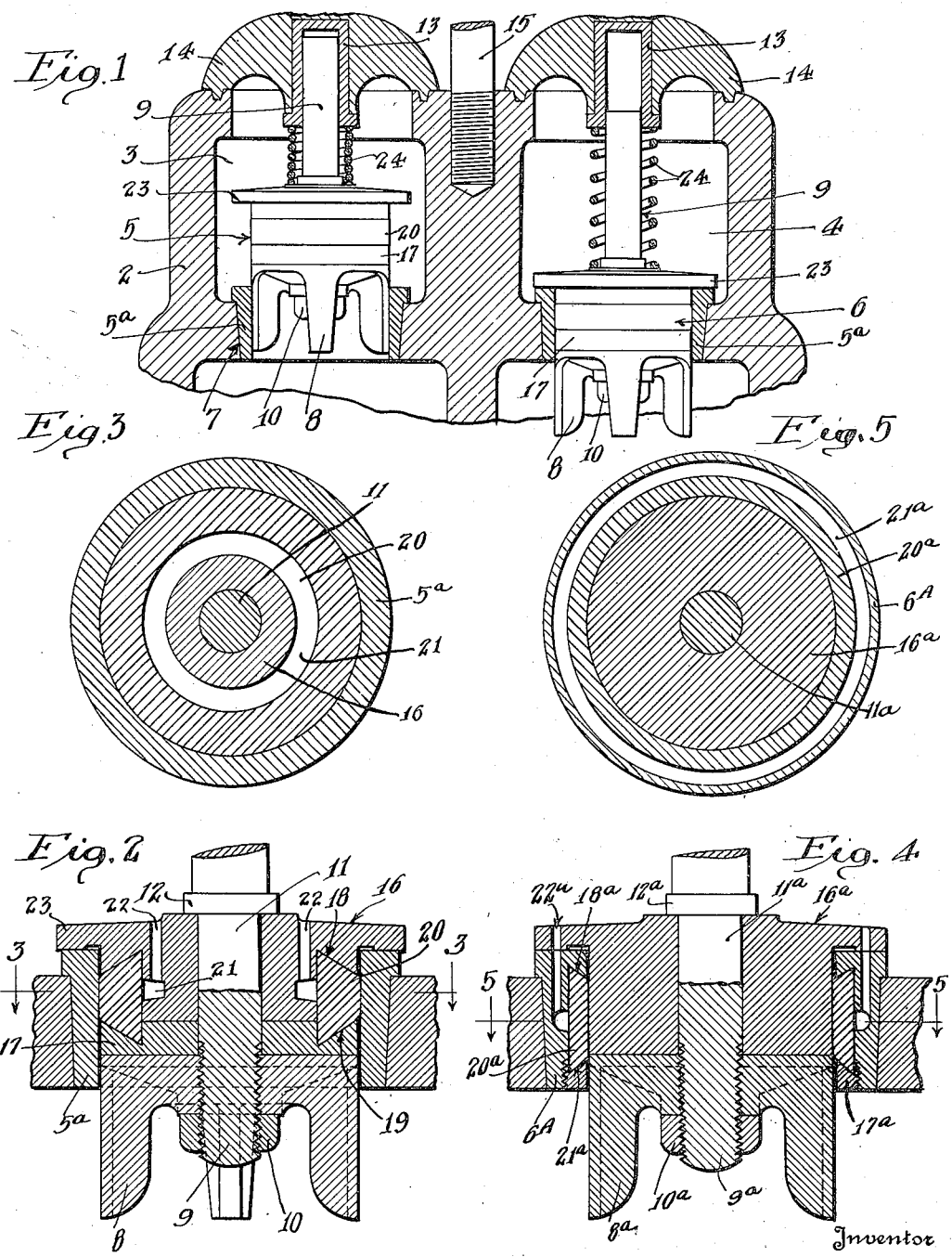
Inventor
Edwin E. Hampton
Glenn A. Scott
By Lyon & Lyon
Attorneys Patented July 16, 1929.

1,721,114

UNITED STATES PATENT OFFICE.

EDWIN EARL HAMPTON AND GLENN A. SCOTT, OF VENTURA, CALIFORNIA.

VALVE FOR SLUSH PUMPS.

Application filed June 29, 1927. Serial No. 202,247.

This invention relates to a valve particularly designed for use in slush pumps and refers particularly to a valve for use with the slush pumps employed in the hydraulic rotary method of drilling wells, such as oil wells, for pumping mud fluid down to the drilling bit.

In drilling wells by the hydraulic rotary method, a pump called a slush pump is continuously operated to pump mud fluid down to the drilling bit in order to carry out the sand and detritus formed by the drilling bit. Since such mud fluid is frequently re-circulated through the pump, it generally contains, in addition to colloidal or suspended mud, a quantity of sand or other detritus. This sand and detritus, in the operation of the pump, rapidly cuts out the seats of the valves. In practical operation the valve seats are cut out so rapidly that great difficulty is experienced in keeping the pumps working. Each oil drilling rig is supplied with two pumps for alternate use so that one of the pumps may have its valves repaired during the operation of the other pump.

An object of the present invention is to provide a valve for a pump of this class, which valve can be operated for long periods of time without requiring that the pump be shut down for repair or replacement of the valves.

The present invention, together with various further objects and advantages of the same, will be readily understood from a description of a preferred form or example of a valve embodying the invention. For this purpose reference is made to the accompanying drawings, in which preferred examples of valves embodying the invention are illustrated.

Referring to the drawings:

Figure 1 is a section of an elevation of a fragment of a slush pump showing two valves embodying the present invention, one being in the open position and the other in the closed position.

Figure 2 is a vertical section of the valve.

Figure 3 is a section on the line 3—3 of Figure 2.

Figure 4 is a vertical section of a slightly modified form of valve.

Figure 5 is a section on the line 5—5 of Figure 4.

Referring to the drawings:

In Figure 1, 2 indicates a fragment of a slush pump having inlet and outlet passages 3 and 4 controlled by the valves 5 and 6. Valves 5 and 6 are of identical construction, hence one only thereof will be described.

The valve 5 is provided with a seat $5^a$ in the form of a sleeve positioned within a tapered opening 7 between the passage 3 and the pumping chamber. The valve includes a spider guide 8 which is threaded to the lower end of a valve rod 9 and held thereto by a nut 10. The valve rod 9 is provided with a stem portion 11 above the threaded end and thereabove with a flange 12 forming a shoulder. Above the flange 12 the rod 9 extends upwardly, fitting within a retaining sleeve 13 mounted within a retaining head 14. In practice, the retaining head 14 is held down by a suitable form of clamp engaging the clamp screw 15. The clamp is not specifically shown inasmuch as any suitable form of clamp may be employed.

Mounted upon the rod 9 is a valve head 16 engaging the flange 12 at its upper end and having its lower end engaging a disc 17 which in turn is engaged and held in position by the spider guide 8. The valve head 16 is provided with an under cut annular groove 18 which registers with an undercut annular groove 19 in the upper end of the disc 17 so that the grooves 18 and 19 together form an annular dove-tailed groove around the valve head 16. Within said groove is positioned a packing 20, preferably of rubber and shaped to fit the groove and having its outer cylindrical surface substantially flush with the cylindrical surface of the head and disc 17.

Behind the packing 20, the head 16 is provided with an annular groove 21 which communicates with vertical and upwardly extending ducts or ports 22. The valve head 16 is also provided with a flange 23 forming a shoulder for engaging the top of the seat $5^a$ and limiting the downward movement of the valve head. There is also provided suitable means such as the coiled spring 24 between the head 16 and retaining sleeve 13 for yieldingly urging the valve into the closed position.

In operation of the valve thus described, in the lower position the packing member 20 is radially expanded against the inner cylindrical surface of the seat $5^a$ to form a fluid-tight connection therewith, the packing member 20 being expanded, due to the pressure imposed thereon by the fluid in the discharge passage, which enters the duct 22 and exerts its pressure at the rear of the packing member 20. The packing of the valve is thus effected at the side of the head and against a surface on which the head 16 does not seat. With the valves heretofore employed in pumps of this class, the packing of the valve has generally been between the top of the seat and flange on the head, thus between surfaces which are forced together in the closing of the valve. With such a packing, the sand and detritus are caused to cut into the packing, due to the pressure causing the valve to seat, and rapidly disintegrates the packing. Moreover, by positioning the packing at such a point, the packing is rapidly cut out at the time the valve opens. In the valve of the present invention, the packing member is expanded against the surface with which it engages and in this way sand and detritus do not operate to cut or damage the packing. Moreover, due to the close fit between the sides of the valve head and valve seat, very little sand and detritus remain between these parts at the time that the valve closes, whereas the top of the sleeve 5ª offers a seat or ledge upon which the sand and detritus accumulate.

Referring to Figures 4 and 5 of the drawing, a slightly modified form of valve is disclosed. The modification consists essentially in reversing positions of the packing member. In Figure 4 a packing member 20ª is indicated positioned within an annular dovetailed groove 18ª, positioned within a seat 6ᴬ and adapted to be inwardly pressed against the cylindrical sides of a valve head 16ª. For this purpose the seat 6ᴬ is provided with an annular groove 21ª at the rear of the packing member 20ª which communicates with one or more upwardly extending ducts 22ª.

The operation of the form of the invention shown in Figure 4 is substantially identical with that of Figures 1 to 3. Each time the valve head 16ª is lowered to the closed position, the packing member 20ª inwardly expands thereagainst, forming a fluid-tight connection. This connection is beween the packing member and a surface against which the packing member is not mechanically driven so that the sand and detritus can not cut out nor destroy the packing member.

While the forms of the invention herein described are well adapted to carry out the objects of the present invention, it is understood that further modifications and changes in the details of the invention may be made and that all of such modifications and changes come within the scope of the following appended claims.

We claim:

1. A valve for slush pumps, comprising a valve head and a sleeve, said valve head having a guide movable through the bore of said sleeve and an element carried by one of said parts expansible by hydraulic pressure against the other whereby to form a complete seal in the fluid passage of said valve, the seal being formed between surfaces which are not seated or positively forced together.

2. A valve for slush pumps, comprising a valve seat and a valve head, the seat and head having adjacent confronting side faces which do not seat, an annular packing member carried by one of the parts and adapted to be expanded against the side face of the other part by hydraulic pressure imposed on said packing member in the closed position of said valve, whereby to form a complete seal in the fluid passage of said valve.

3. A slush pump valve, comprising a valve head slidable in a sleeve, a stop operative to limit the motion of the head through the sleeve, an element expansible by hydraulic pressure to pack the space between confronting side faces of the head and sleeve, and a guide member connected with the head for guiding the same into and out of the sleeve.

4. A slush pump valve, comprising a valve head and a sleeve, the head and sleeve having adjacent side faces which do not seat, means for limiting the motion of the head relative to the sleeve, and an annular packing member dove-tailed into one of said parts and adapted to be expanded by hydraulic pressure against a confronting side face of the other part to thereby seal against the passage of fluid through the valve.

5. A slush pump valve, comprising a valve head slidable in a sleeve, an annular packing member dove-tailed into one of said parts and expansible by hydraulic pressure to pack against a confronting side face of the other part, means for limiting the relative motion of the head and sleeve, and ports extending from a fluid chamber of the pump to behind the packing member, for expanding the same by the pressure of the fluid being pumped to thereby seal against the passage of fluid through the valve.

Signed at Ventura, California this 3rd day of June 1927.

EDWIN EARL HAMPTON.
GLENN A. SCOTT.